Figure 1:
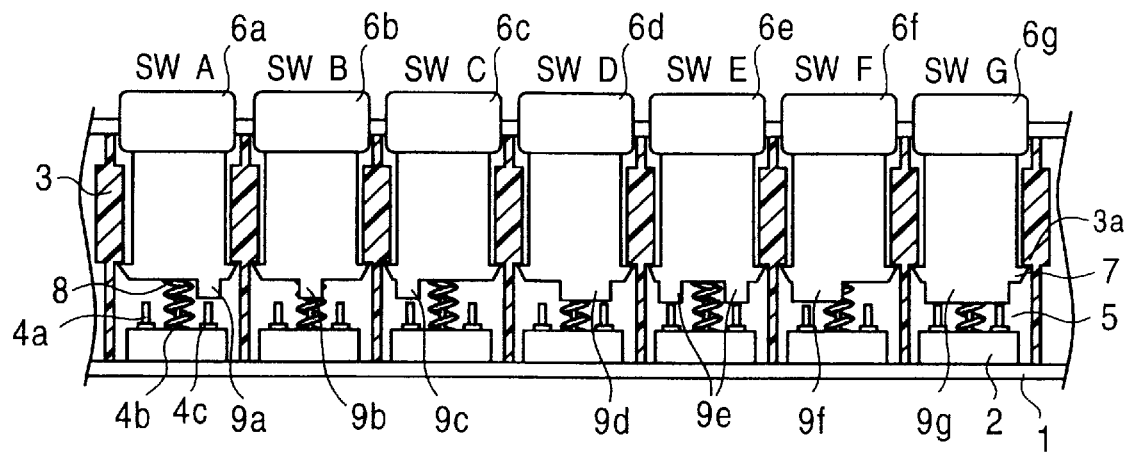

United States Patent [19]
Mitsuzuka et al.

[11] Patent Number: 6,163,282
[45] Date of Patent: Dec. 19, 2000

[54] VEHICLE EQUIPMENT CONTROL DEVICE

[75] Inventors: Katsuya Mitsuzuka; Ken Mizuta, both of Miyagi, Japan

[73] Assignee: Alps Electric Co., Ltd., Japan

[21] Appl. No.: 09/086,916

[22] Filed: May 29, 1998

[30] Foreign Application Priority Data

May 30, 1997 [JP] Japan ..................................... 9-142373

[51] Int. Cl.⁷ ........................... H03K 17/94; H03M 11/00
[52] U.S. Cl. ................................ 341/22; 341/23; 200/54; 200/533
[58] Field of Search ....................... 341/22, 23; 200/5 R, 200/5 A, 5 D, 5 E, 518, 533

[56] References Cited

U.S. PATENT DOCUMENTS 5,579,002 11/1996 Iggulden et al. ........................... 341/23

FOREIGN PATENT DOCUMENTS 7262867 10/1995 Japan .

*Primary Examiner*—Michael Horabik
*Assistant Examiner*—Timothy Edwards, Jr.
*Attorney, Agent, or Firm*—Brinks Hofer Gilson & Lione

[57] ABSTRACT

Disclosed is a vehicle equipment control device capable of effecting discrimination between a plurality of switch functions without involving any change in the circuit configuration.

A plurality of detection switches 2 each of which has three driving pins 4a through 4c are mounted on a printed circuit board 1, and a plurality of key tops 6a through 6g are slidably supported by a housing 3 in correspondence with the detection switches 2. Provided on the lower surfaces of the key tops 6a through 6g are driving sections 9a through 9g each capable of simultaneously depressing arbitrary one or a plurality of driving pins 4a through 4c of the corresponding detection switch 2. When the driving pins 4a through 4c are selectively depressed by these driving sections 9a through 9g, each detection switch 2 outputs a switch signal peculiar to it, and discrimination between the control functions set for the key tops 6a through 6g is effected on the control circuit unit side by using this switch signal as a recognition signal.

12 Claims, 2 Drawing Sheets

Figure 3:
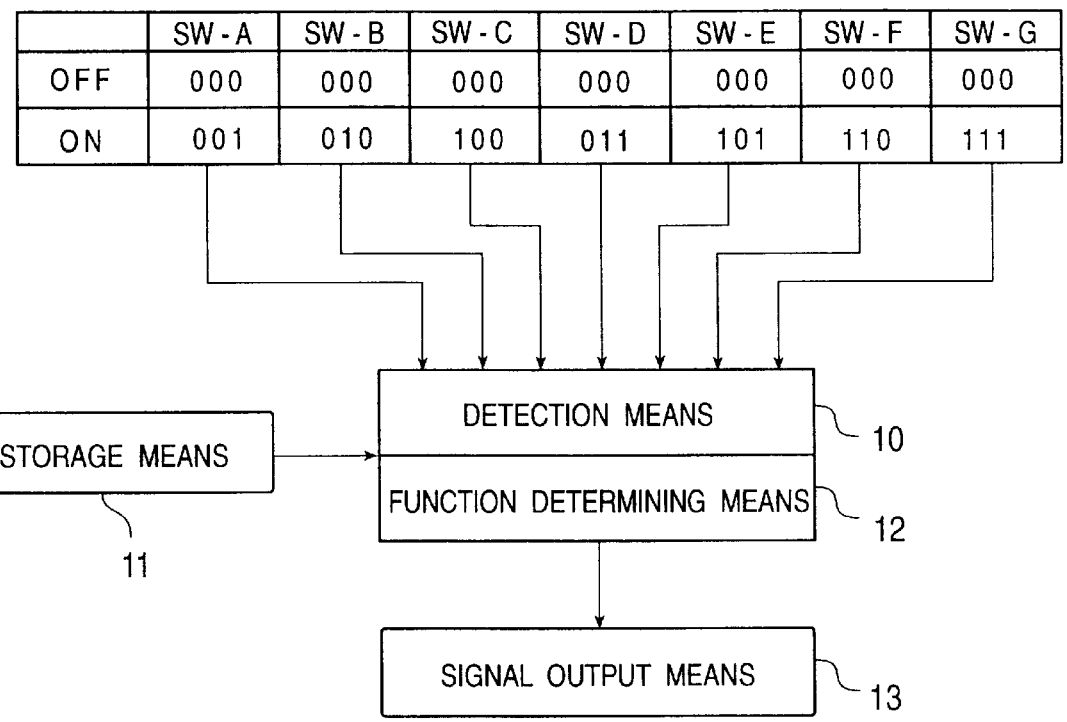

VEHICLE EQUIPMENT CONTROL DEVICE

BACKGROUND OF THE INVENTION

1. Field of the Invention

The present invention relates to a vehicle equipment control device equipped with a plurality of switches for giving commands for various control operations and, in particular, to a vehicle equipment control device capable of automatically discriminating between different kinds of switches.

2. Description of the Related Art

On the instrument panel of an automobile, a number of switches are arranged around the meters. A switch for giving a command for a particular function is not always mounted at the same position. According to the grade, type, etc. of the vehicle, positions where switches for particular functions are mounted may differ. Suppose, for example, a plurality of mounting sections are provided in a horizontal row in the unit attachment portion. In a vehicle of a certain grade, a switch for the driver's seat heater may be mounted to the mounting section at the left-most end, and in a vehicle of another grade, another switch for another function, for example, traction control, may be mounted to the same mounting section.

Japanese Patent Laid-Open No. 7-262867 proposes a vehicle equipment control device endowed with a function for automatically discriminating between the types of control operations to be effected by different switches when the switches are mounted to arbitrary mounting sections. In this proposed vehicle equipment control device, there is provided for each switch a recognition signal generating means for outputting switch signals, which differ from switch to switch, when the switches are turned on. Further, a switch discrimination circuit which outputs an output signal for driving a predetermined load upon receiving a switch signal from the recognition signal generating means is provided in a control circuit unit, and the switches are replaced in a cassette-like manner, whereby a switch signal from the recognition signal generating means of the newly attached switch is read by the switch discrimination circuit. The recognition signal generating means have different internal wirings for different types of switch, and different switch signals are output when the switch contacts are turned on. These switch signals serve as recognition signals for indicating the uses of the switches. Further, the switch discrimination circuit has input terminals and logic circuits corresponding to the output terminals of the switches, and outputs driving signals to the loads corresponding to the functions of the switches by processing the switch signals from the switches by the logic circuits.

Thus, in this vehicle equipment control device, constructed as described above, there is no need to change the circuit configuration of the control circuit unit according to the grade, type, etc. of the vehicle, and it is possible to execute operations corresponding to the functions of the switches solely by exchanging a plurality of switches adapted to output different switch signals.

However, in the conventional device as described above, different switch signals are output from the recognition signal generating means by changing the internal wiring of the switches, and it is necessary to provide switches in a number corresponding to the functions of the switches with different internal wirings, so that not only is it impossible to use general-purpose switches, but the switch mounting position with respect to the printed circuit board must be changed each time the switch is mounted, resulting in an increase in production cost. Further, there are limitations as to the combination of the internal wirings on the switch side, and there are naturally limitaions as to the combination of logic circuits on the switch discrimination circuit side, so that it is difficult to cope with an increase in control functions.

SUMMARY OF THE INVENTION

In accordance with the present invention, a plurality of driving pins capable of independently effecting contact switching are provided on a set of detection switches corresponding to a single key top, and a driving section capable of simultaneously operating one or a plurality of these driving pins is provided on the key top side. Due to this construction, different switch signals are output from a plurality of sets of detection switches of the same kind in accordance with the combination of a plurality of driving pins provided on a set of detection switches and the driving section provided on the key top, so that it is possible to automatically discriminate between the types of switches by a very simple construction in which simply the configuration of the driving section is changed, with the circuit configuration including the detection switches and the processing circuits thereof remaining as it is, whereby it is possible to achieve a reduction in production cost.

In the vehicle equipment control device of the present invention, there are provided a plurality of sets of detection switches mounted on a printed circuit board, and a plurality of key tops arranged in correspondence with these sets of detection switches, each set of said detection switches having a plurality of driving pins capable of independently performing contact switching, each of said key tops having a driving section capable of simultaneously operating one or a plurality of the driving pins provided on the corresponding detection switch, different recognition signals being output from the sets of detection switches in correspondence with the configurations of these driving sections, discrimination between control functions respectively set for the key tops being effected in accordance with these recognition signals.

While it is possible to arrange a plurality of single-pin type push switches having one driving pins to form a set of detection switches, the operation processes including the soldering of the switches to the printed circuit board are facilitated by using a multiple-type push switch in which a plurality of driving pins protrude from a common casing as a set of detection switches.

BRIEF DESCRIPTION OF THE DRAWINGS

FIG. 1 is a sectional view showing the essential part of a vehicle equipment control device according to an embodiment of the present invention;

FIG. 2 is a sectional view of the vehicle equipment control device of FIG. 1 as seen from a different direction;

FIG. 3 is a schematic diagram illustrating a control circuit unit provided in the vehicle equipment control device; and FIG. 4 is a perspective view of a panel unit to which the vehicle equipment control device is mounted.

DESCRIPTION OF THE PREFERRED EMBODIMENT

An embodiment of the present invention will be described with reference to the drawings. FIG. 1 is a sectional view showing the essential part of a vehicle equipment control device according to an embodiment of the present invention; FIG. 2 is a sectional view of the vehicle equipment control device of FIG. 1 as seen from a different direction; FIG. 3 is a diagram illustrating a control circuit unit provided in the vehicle equipment control device; and FIG. 4 is a perspective view of a panel unit to which the vehicle equipment control device is mounted.

Figure 2:
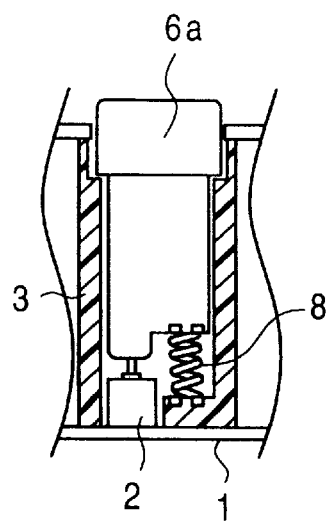

As shown in FIGS. 1 and 2, in this embodiment, seven detection switches 2 (hereinafter referred to as SW-A through SW-G as needed) are mounted on a printed circuit board 1, which is secured to the inner bottom surface of a housing 3. One detection switch SW-A is a triple push switch in which three driving pins 4a, 4b and 4c protrude from the upper surface of a casing and which has three built-in contacts (not shown) which are turned on by depressing the driving pins 4a, 4b and 4c. The other detection switches SW-B through SW-G are also triple push switches.

Figure 4:
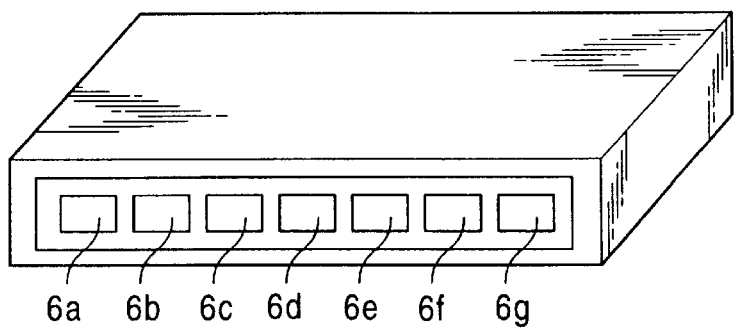

The above housing 3 is incorporated in the panel unit shown in FIG. 4. This housing 3 has seven guide holes 5 corresponding to the detection switches 2, and a stopper step portion 3a is formed on the inner wall of each guide hole 5. First through seventh key tops 6a through 6g are slidably inserted into the guide holes 5, and a stopper claw portion 7 is formed on the side wall of each of these key tops 6a through 6g. A coil spring 8 is provided between the lower surface of each of the key tops 6a through 6g and the inner bottom surface of the housing 3. The key tops 6a through 6g are biased by the coil springs 8 so as to protrude beyond the guide holes 5, but are prevented from being detached from the guide holes 5 due to the abutment of the claw portions 7 against the step portions 3a. Driving sections 9a through 9g which can simultaneously depress one or a plurality of the driving pins 4a through 4c of each of the detection switches 2 are formed on the lower surfaces of the key tops 6a through 6g. In this embodiment, a driving section 9a which can only depress the driving pin 4c of the detection switch SW-A is formed on the first key top 6a. Similarly, a driving section 9b which can only depress the driving pin 4b of the detection switch SW-B is formed on the second key top 6b; a driving section 9c which can only depress the driving pin 4a of the detection switch SW-C is formed on the third key top 6c; a driving section 9d which can depress the driving pins 4b and 4c of the detection switch SW-D is formed on the fourth key top 6d; a driving section 9e which can depress the driving pins 4a and 4c of the detection switch SW-E is formed on the fifth key top 6e; a driving section 9f which can depress the driving pins 4a and 4b of the detection switch SW-F is formed on the sixth key top 6f; and a driving section 9g which can depress all the driving pins 4a through 4c of the detection switch SW-G is formed on the seventh key top 6f.

As shown in FIG. 3, when the key tops 6a through 6g are operated, the corresponding detection switches SW-A through SW-G output switch signals "001", "010", "100", "011", "101", "110" and "111", respectively, which are peculiar to these switches. These switch signals are input to a control circuit unit as recognition signals. This control circuit unit is equipped with a detection means 10 for detecting the switch signals from the detection signals SW-A through SW-G, a storage means 11 for storing control functions set for each of the key tops 6a through 6g, a function determining means 12 for determining the control function of each of the key tops 6a through 6g in accordance with the detection result of the detection means 10 and the storage means 11, and a signal output means 13 for outputting a control signal corresponding to the control function determined by the function determining means 12. In this embodiment, the following control functions are respectively set for the key tops 6a through 6g: traction control function, suspension control function, driver's seat heater control function, driver's seat backrest heater control function, control function for the heater for the seat next to the driver's seat, control function for the heater for the backrest of the seat next to the driver's seat, and mirror tuck-away control function. A correspondence table indicating the correspondence between these control functions and the control signals corresponding to the control functions is stored in the storage means 11 in advance.

Next, the operation of the vehicle equipment control device, constructed as described above, will be described. For example, when the top surface of the first key top 6a is depressed against the resilient force of the coil spring 8, the first key top 6a slides on the inner wall of the guide hole 5 toward the printed circuit board 1, and the driving section 9a of the first key top 6a depresses only the driving pin 4c of the detection switch SW-A. As a result, one contact of the detection switch SW-A is turned on by the driving pin 4c, and the recognition signal "001", which is peculiar to the detection switch SW-A, is output to the control circuit unit. In the control circuit unit, the detection means 10 detects, on the basis of the recognition signal "001", that the detection switch SW-A has been turned on, the function determining means 12 determines the function of the first key top 6a from the data of the storage means 11, and the signal output means 13 outputs the control signal corresponding to the determined control function, whereby traction control is executed.

When the second key top 6b is depressed, the driving section 9b of the second key top 6b depresses only the driving pin 4b of the detection switch SW-B, with the result that the recognition signal "010", which is peculiar to the detection switch SW-B, is output, and, on the basis of this recognition signal "010", the control signal for suspension control is output from the signal output means 13 of the control circuit unit. Similarly, when the other key tops 6c through 6g are depressed, control signals corresponding to the control functions set for the operated key tops 6c through 6g are output.

In this embodiment, constructed as described above, the key tops 6a through 6g corresponding to a plurality of sets of detection switches SW-A through SW-G are respectively equipped with the driving members 9a through 9g each capable of simultaneously depressing one or a plurality of the driving pins 4a through 4c of the corresponding one of the detection switches SW-A through SW-G, so that, in accordance with the combination of the driving pins 4a through 4c and the driving sections 9a through 9g, it is possible to output different switch signals from a plurality of sets of detection switches SW-A through SW-G of the same kind. Thus, when, for example, the detection switch SW-B, which is the second from the left of FIG. 1, is to be endowed with traction control function, it is only necessary to fit the first key top 6a into the guide hole 5 corresponding to the detection switch SW-B, and there is no need to effect a change in the detection switches SW-A through SW-G or the control circuit unit, whereby the operating process is simplified, and a reliability in electrical connection can be enhanced.

While in the above-described embodiment seven different switch signals are output from the seven detection switches SW-A through SW-G by providing three driving pins 4a through 4c in each set of detection switch 2, it is also possible to increase or decrease the number of driving pins. In this case, assuming that n (=2 or more) driving pins are provided in one set of detection switch, it is possible to output ($2^n-1$) kinds of different switch signals in accordance with the combination of these driving pins and the driving sections of the key tops, thus increasing the kinds of control functions.

Further, while in the above-described embodiment the detection switch 2 consists of a triple push switch in which three driving pins 4a, 4b and 4c protrude from the same casing, it is also possible to use, instead of the triple push switch, a switch in which three single-pin type push switches each having a single driving pin are arranged to form a set of detection switch 2. In this case also, it is possible to use n driving pins.

The present invention, carried out as described above, provides the following advantages.

In accordance with the present invention, there are provided a plurality of sets of detection switches mounted on a printed circuit board, and a plurality of key tops arranged in correspondence with these sets of detection switches, each set of said detection switches having a plurality of driving pins capable of independently effecting contact switching, each of said key tops having a driving section capable of simultaneously operating one or a plurality of the driving pins provided on the corresponding detection switch, different recognition signals being output from the sets of detection switches in correspondence with the configurations of these driving sections, control functions set for each of the key tops being determined on the basis of these recognition signals. Due to this construction, different switch signals are output from a plurality of sets of detection switches of the same kind, so that there is no need to effect any change in the detection switches or the circuit configuration including the processing circuit thereof, and it is only necessary to change the configuration of the driving section. Thus, it is possible to automatically determine the type of each of the switches with a very simple construction, thereby achieving a reduction in production cost.

What is claimed is:

1. A vehicle equipment control device comprising:

a plurality of sets of detection switches mounted on a printed circuit board; and a plurality of key tops arranged in correspondence with the sets of detection switches, each of the sets of detection switches having a plurality of driving pins independently effecting contact switching, each of said key tops having a driving section simultaneously operating at least one of the driving pins of the corresponding detection switch, the driving section having a protruding configuration with a wider width than a sectional width of one of said driving pins, wherein different recognition signals are outputted from the sets of said detection switches while changing a number and an arrangement of the driving pins operated in correspondence with the configurations of the driving sections, and discrimination between control functions set for said key tops is effected on the basis of the different recognition signals.

2. A vehicle equipment control device according to claim 1, wherein said detection switch is a multi-type push switch in which a plurality of push switches provided with said driving pins protruded from a casing are stored in said casing.

3. A vehicle equipment control device according to claim 1, wherein said detection switch is formed by arranging a plurality of single-pin type push switches each having a single driving pin, each of said detection switches having a same number of driving pins.

4. A vehicle equipment control device according to claim 1, wherein the printed circuit board to which said detection switches are mounted is secured in position in a housing, and wherein said housing has guide holes into which the key tops capable of depressing each of the driving pins of said detection switches are slidably inserted, a number of guide holes corresponding to the plurality of sets of detection switches, a stopper step portion being provided on an inner wall of each of the guide holes, each key top having a side surface with a stopper claw portion to be engaged with said stopper step portion to prevent the key top from being detached from the guide hole.

5. A vehicle equipment control device according to claim 4, wherein a coil is provided between each key top and a bottom surface of said housing to bias said key top upwardly.

6. A vehicle equipment control device according to claim 1, wherein one of the control functions set for the key tops is a control function for traction control.

7. A vehicle equipment control device according to claim 1, wherein one of the control functions set for the key tops is a control function for suspension control.

8. A vehicle equipment control device according to claim 1, wherein one of the control functions set for the key tops is a control function for a driver's seat heater.

9. A vehicle equipment control device according to claim 1, wherein one of the control functions set for the key tops is a control function for a driver's seat backrest heater.

10. A vehicle equipment control device according to claim 1, wherein one of the control functions set for the key tops is a control function for a heater for the seat next to the driver's seat.

11. A vehicle equipment control device according to claim 1, wherein one of the control functions set for the key tops is a control function for a heater for the backrest of the seat next to the driver's seat.

12. A vehicle equipment control device according to claim 1, wherein one of the control functions set for the key tops is a control function for mirror tuck-away operation.

* * * * *